Aug. 8, 1961 W. J. SCHEUTZOW 2,995,192
ROTOR FOR HELICOPTER OR THE LIKE
Filed April 1, 1960 4 Sheets-Sheet 1
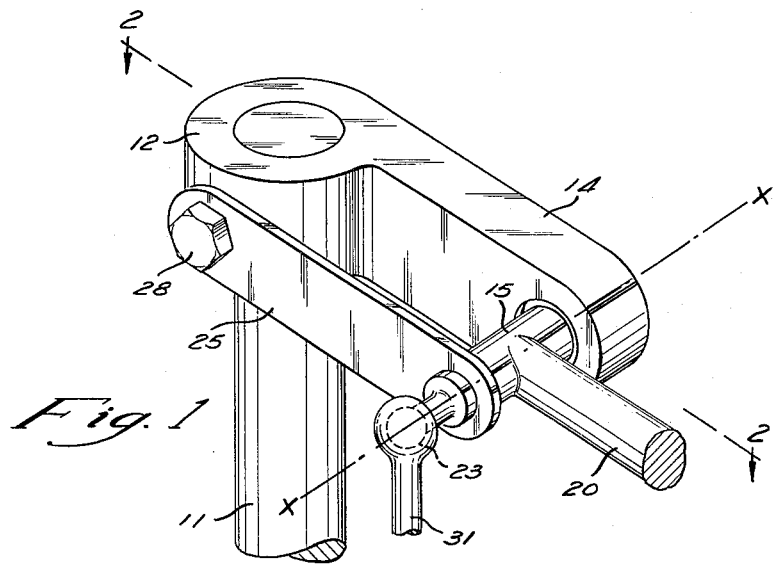
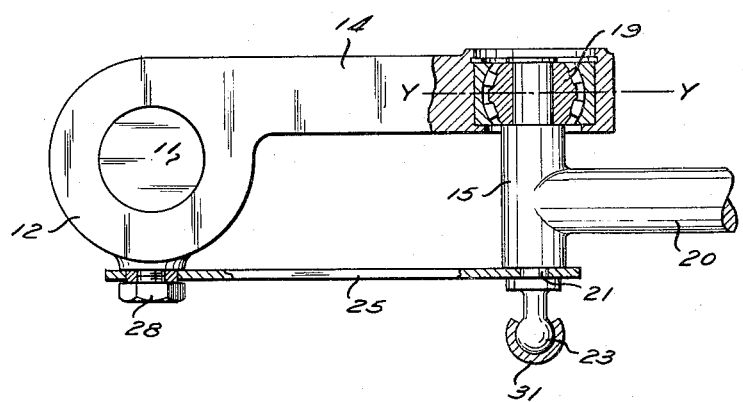
INVENTOR.
WILBUR J. SCHEUTZOW
BY
WATTS, EDGERTON, PYLE, & FISHER
ATTORNEYS Aug. 8, 1961  W. J. SCHEUTZOW  2,995,192
ROTOR FOR HELICOPTER OR THE LIKE
Filed April 1, 1960  4 Sheets-Sheet 2

INVENTOR.
WILBUR J. SCHEUTZOW
BY
WATTS, EDGERTON, PYLE, & FISHER

ATTORNEYS

Aug. 8, 1961  W. J. SCHEUTZOW  2,995,192
ROTOR FOR HELICOPTER OR THE LIKE
Filed April 1, 1960  4 Sheets—Sheet 4

INVENTOR.
WILBUR J. SCHEUTZOW
BY Pyle & Fisher
ATTORNEYS

United States Patent Office 2,995,192
Patented Aug. 8, 1961

2,995,192
ROTOR FOR HELICOPTER OR THE LIKE
Wilbur J. Scheutzow, 451 Lynn Drive, Berea, Ohio
Filed Apr. 1, 1960, Ser. No. 19,369
13 Claims. (Cl. 170—160.25)

This invention relates to a rotor hub for helicopters or the like and more particularly to a rotor hub for a helicopter or the like having a flapping hinge offset from the center of the rotor hub and having means for pitch adjustment of the rotor blade.

This application is a continuation-in-part application of United States application Serial No. 679,456 filed by by me on August 21, 1957, now abandoned, for "Rotative Winged Aircraft."

Prior art helicopters and autogyros have been provided with rotor hubs in which the flapping hinge and provision for pitch adjustment of the blade has been accomplished by the use of separately journaled shafts for each of these functions. This has required the use of many anti-friction bearings for mounting each rotor blade, hence requiring the assembly and adjustment of many precise parts.

It is, therefore, an object of the present invention to provide a simplified rotor hub structure.

Another object of the invention is to provide an inexpensive structure which is more simple to manufacture and assemble than prior art structures.

A further object is to provide a structure in which anti-friction bearing life is increased by increasing the total movement of the bearing, thereby reducing bearing fretting.

A still further object of this invention is to provide a structure which is of light weight by reason of its simplicity.

Other objects and attendant advantages of this invention will be readily appreciated as the same becomes better understood by reference to the following detailed description when considered in connection with the following drawings, wherein:

FIGURE 1 is a perspective view of a rotor hub illustrating the principles of the invention;

FIGURE 2 is a plan view of the structure shown in FIGURE 1, partly in cross section, taken on the line 2—2 of FIGURE 1;

Figure 3:
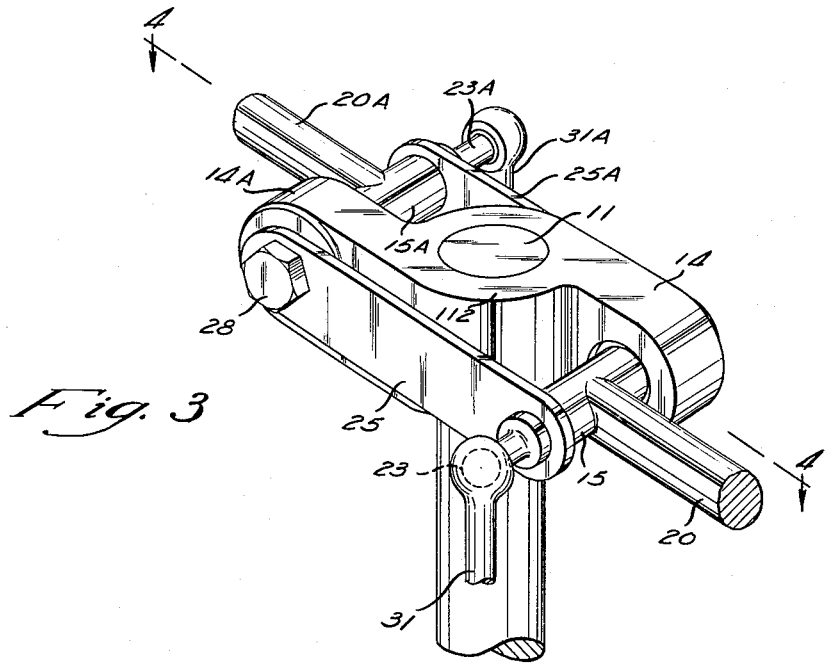
FIGURE 3 is a perspective view of a rotor hub of two blade configuration, employing the principles shown in FIGURE 1.

Referring now to the drawings, wherein the like reference characters designate like or corresponding parts throughout the several views, in FIGURE 1 there is a rotatable hub 12. A rotor blade support 20 is attached to the hub 12.

A drive shaft 11 is rotatably mounted to an aircraft fuselage (not shown). Power to drive the blade may conveniently be supplied by an engine (not shown) in the fuselage, which causes rotation of the drive shaft 11. Alternatively, power may be supplied by means of an engine in the rotor blade, or the system may be used on an autogyro type of aircraft.

Continuing with reference to FIGURE 1, the rotor blade support 20 is supported by a flapping hinge 15 which is pivotally attached to the hub 12. The line x—x is the flapping axis established by the hinge 15. Hub extension 14 provides a support for the flapping hinge 15, which support is offset from the center of the hub 12.

In FIGURE 2, spherical bearing 19, designed to take thrust and radial loads, supports one end of flapping hinge 15 and establishes a fixed pivot point with respect to extension 14. The other end of the hinge 15 is held at bearing 21 in spaced relationship to hub 12 by link 25. Link 25 is attached to hub 12 by a bolt pivot 28, and is free to pivot about the bolt 28 as a pivot bearing. Link 25 is in a near parallel relationship to hub extension 14.

In FIGURE 1, a knuckle 23, at one end of the flapping hinge 15, provides pivotal means for attaching the upper end of a push-pull control rod 31. The lower end of the control rod 31 is arranged in any suitable connection with the aircraft pilot manual control mechanism such as, for example, through means of a swash plate (not shown) as is well known in the art.

Upon pilot manipulation of the manual control means, the push-pull control rod 31 will raise or lower the knuckle 23, thereby rotating the blade support 20 and changing blade pitch. The movement of the rod 31 causes limited rotation of the flapping hinge which may, because of the limited movement, be considered to take place substantially about the line y—y through the spherical bearing 19, as shown in FIGURE 2. As the knuckle 23 is raised or lowered, the movable end of flapping hinge 15 is restrained and held in spaced relationship to the hub 12 by link 25. In FIGURES 1, 2, the link 25 is a member which is flexible in the manner of a thin, steel trap, so that it may twist as required to accompany the pitch change movement of the flapping hinge 15 about the spherical bearing.

As is well known, anti-friction bearings as presently applied to helicopter and the like rotor hubs are subjected to severe fretting. Much lubricating and frequent replacement of bearings is necessary to combat such fretting. This fretting of such bearings is caused by the bearing being oscillated through too small a movement while under high operative load, and creating a condition wherein lubricant is displaced. Because the loaded surface is not rotated to a relieved position, it cannot pick up new lubricant to carry into the pressure area.

The present invention greatly increases bearing movement and thereby reduces fretting because pitch change movement is combined with blade flapping movement within spherical bearing 19. Consequently, the total movement experienced by bearing 19 is greater than would apply to bearings in other prior art rotor hubs where separate bearings for pitch change and flapping movements are provided; and with greater movement within the spherical bearing 19, bearing fretting is reduced.

The foregoing description of the rotor hub illustrated in FIGURES 1 and 2 pertains to a single blade configuration. The further incorporation of the principles of the invention in a rotor hub providing support for two blades is shown in FIGURES 3 and 4.

At this phase in the discussion of the concepts of the present invention, it is well to emphasize that the drawings and this description are greatly simplified in mechanical detail in order to separate the principle of operation from the actual structure employed in an operative aircraft. The technical renditions of the mechanical means of producing knuckle 23, and the best commercial means of producing a pivotal connection at the location of bolt 28 would be unnecessary encumbrances upon the drawing and description of this invention and would add nothing to the understanding of the basic concept. With this commentary in view, the FIGURES 3 and 4 are then employed to bring the comprehension of the present invention forward from the most simple embodiment of the invention as described in FIGURES 1 and 2.

Figure 4:
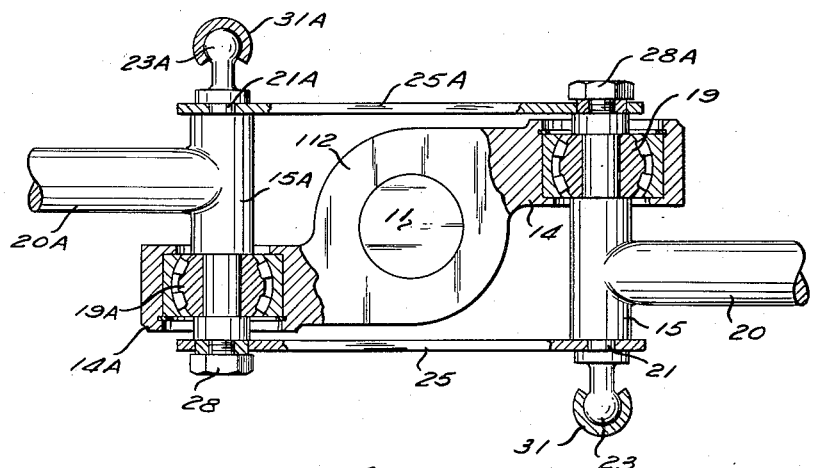
FIGURE 4 is a plan view of the structure shown in FIGURE 3 partly in cross section, taken on the line 4—4 of FIGURE 3.

The embodiment shown in FIGURES 3 and 4 is essentially a double embodiment of that shown in FIGURES 2 and 1 with the main difference being that the flexible strap 25 is not attached directly at the side of the hub 12, but rather is extended to a like pivotal connection at bolt 28 on the end of the flapping hinge 15A of the opposed blade. More specifically, in the embodiment of FIGURES 3 and 4 there are two extensions 14 and 14A from hub 112 which each carry spherical bearings 19 and 19A. The flapping hinge 15 is carried by the bearing 19 as shown and described in FIGURES 1 and 2, and a similar hinge 15A and its blade mounting 20A is carried by bearing 19A.

The strap 25, which in FIGURE 2 is illustrated extending from the bearing 21 to a position on the side of the hub opposite the shaft 11, is shown in FIGURE 4 extending from bearing 21, pivotally attached at bolt 28 to the end of hinge 15A; and, in a like manner, strap 25A extending from bearing 21A is pivotally attached to the end of hinge 15 by bolt 28A. The direct attachment of straps 25 and 25A at bolts 28 and 28A to the hinges 15 and 15A provides the most convenient and compact structure for a two-blade configuration. The small movement induced at bolt 28 into hinge 15 from hinge 15A through strap 25 when blade pitch change movement is made at rod 31A does not materially alter the function of flapping hinge 15. In a like manner, movement of hinge 15 producing a small movement at bolt 28A inducing movement in hinge 15A through strap 25A does not materially alter the function of hinge 15A.

In other words, the location of bolts 28 and 28A on the ends of the respective flapping hinges is a convenience for compact construction.

Figure 5:
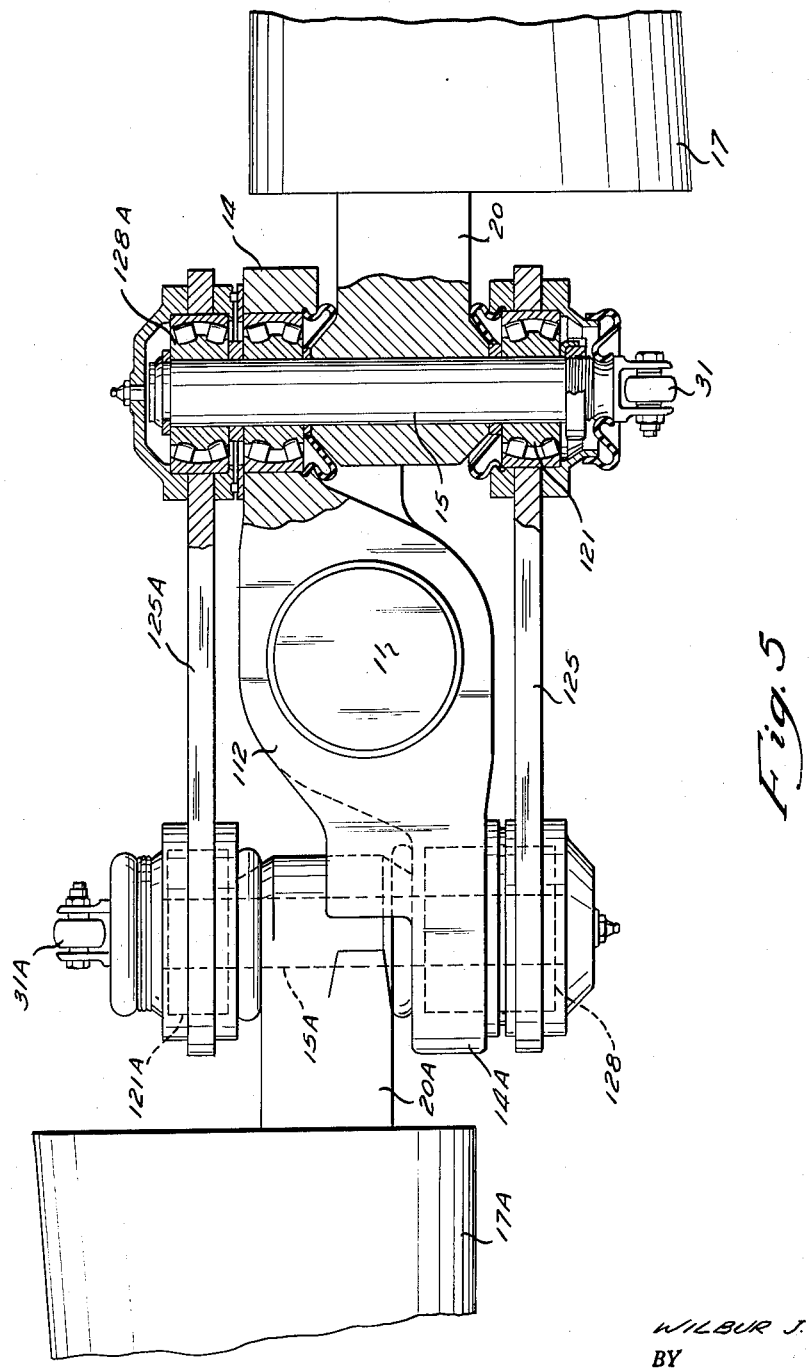
FIGURE 5 is a plan view, partly in cross section, of a two-blade configuration similar to FIGURE 4, in which anti-friction bearings are provided at all pivot points.

The two-blade embodiment of FIGURE 5, showing flapping hinges 15 and 15A, carrying blade supports 20 and 20A, with a portion of blades 17 and 17A shown, functions in the manner described for FIGURES 3 and 4. Instead of employing flexible straps 25 and 25A as shown in FIGURE 4, the straps 125 and 125A are relatively rigid. However, to provide the freedom of motion required in order that the rigid straps 125 and 125A may follow the movement of flapping hinges 15 and 15A when blade pitch control movements are made by rods 31 and 31A, spherical anti-friction bearings 121 and 128 are provided on strap 125, and like bearings 121A and 128A are provided on strap 125A.

The drawings and preceding description have set forth a solid shaft 11 with push-pull control rods 31, 31A operated by a swash plate, which provide a control means adapted to drive the knuckles 23, 23A to a selected location, which in the double blade configuration of FIGURES 3-5 is a simultaneous driving in equal amounts in opposed directions in their respective established swingable fields.

Such swash plate control structures are old and well known. A specific structure, best capable of such control operation for the double blade structure shown in FIGURE 5 is shown in FIGURE 6.

Figure 6:
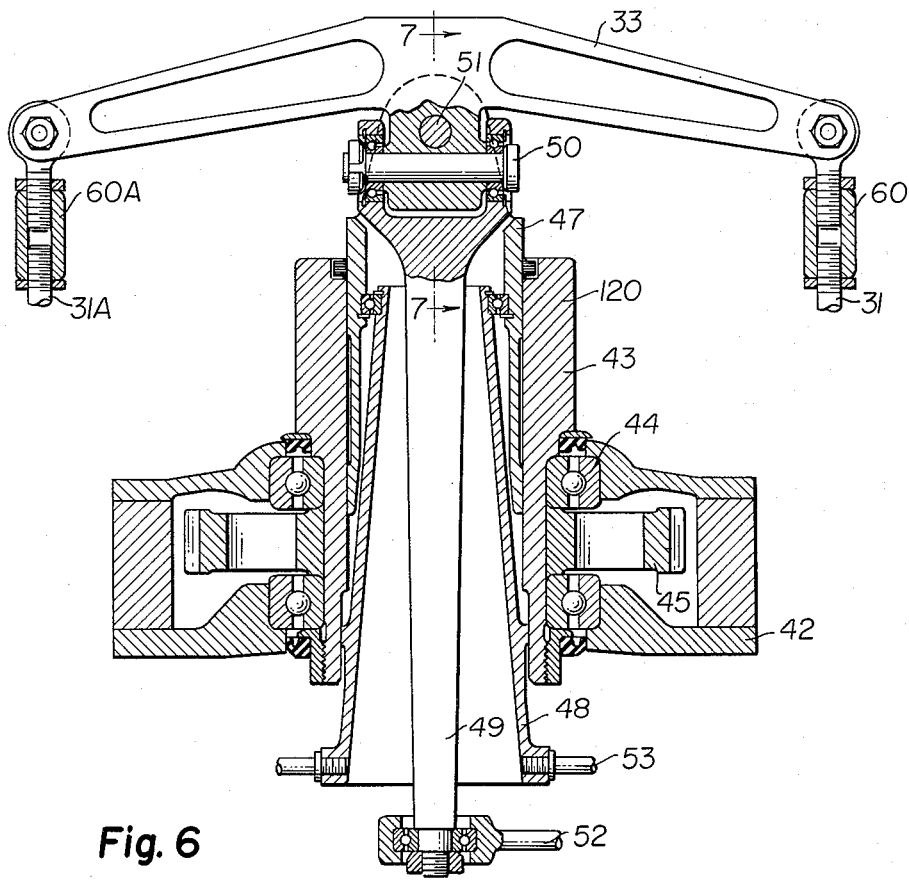
FIGURE 6 is a vertical section of a suitable control apparatus for pilot operation of the structure set forth in FIGURE 4.
Figure 7:
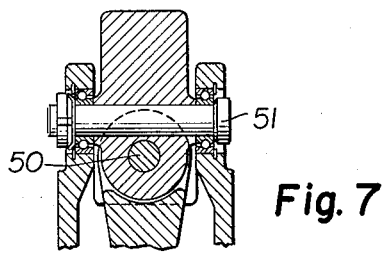
FIGURE 7 is a section taken along line 7—7 of FIGURE 6.

FIGURE 6 illustrates in some detail the construction and arrangement of a power driving hub with a control beam mechanism 33 pivotally mounted thereon. The hub 120 replaces shaft 11 and carries the drive and control apparatus.

A support 42 carried by the aircraft structure interconnects the aircraft with the rotating drive hub 120, through bearings 44. The drive hub 120 in FIGURE 6 is illustrated as being composed of a drive housing 43 with a vertically reciprocable sleeve 47 carried therein. A spur gear 45 carried by the housing 43 within the protective covering of the support 42 receives driving force from a suitable drive pinion not shown. The housing 43 and the sleeve 47 rotate together, and the sleeve is vertically adjustable within the housing. In order to produce such vertical adjustment, a collective pitch control 48 is provided. Control 48 is moved vertically to raise and lower sleeve 47 and hence raise and lower the beam 33. Such control of the beam 33 will swing both flapping hinges up or down together. That is, the control rods 31, 31A will be moved in the same direction. The movement produces the collective pitch control needed to cause the craft to rise or descend. This collective control is known in the art.

Control 48 appears conical in cross section in order to permit the swinging movement of a beam control 49 therein. Beam 49 operatively controlled by the pilot, operates a universal type of joint consisting of axle pins 50, 51 suitably bearinged and interjoined. A bearinged control arm 52 leads by means of suitable linkage into the aircraft cab for cyclic control by the pilot. Control arm 52 is swingable in any direction and will cause the beam 33 to rotate in an inclined plane in order to move the control rods 31, 31A in equal and opposite directions. This is known as cyclic pitch control which produces flight direction. A similar arm connected at 53 leads to the pilot for control of the collective pitch control mechanism. Beam 33 extends diagonally to extreme ends positioned over knuckles 23, and 23A. An adjustable length linkage 60, 60A at the respective ends enables the control rods 31, 31A to be directed upwardly, rather than as shown in FIGURES 1-5, to receive the simultaneously control movement.

To summarize, it is believed that this invention shown and described in a form to clearly teach the principles of the invention, but not restricted to such structure, resides in the placement of a flapping hinge offset from the center of rotation and carried at a universal pivot on one end of the flapping hinge and rotated to swing about that pivot through a substantially conical path by means of a fixed length link, wherein the juncture between the link and the hinge lies substantially at the apex of a triangular relation including the link, the hinge, and the hub, and can be flexed vertically to induce the conical path movement of the hinge and wherein the hinge has one position in which it lies upon a plane extending normal to the axis of rotation of the hub with control movement causing the apex corner of the triangular relationship to move above and below this normal plane condition.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In an aircraft, the provision of a blade supporting structure comprising means establishing a central axis, a hub structure rotatable about said central axis, the provision of a flapping hinge carried by said hub structure, means mounting said hinge to pivot about one point carried by said hub, flight control means in operative control of said hinge to drive said hinge through a swing path consisting essentially of a segment of a substantially conical form, and to provide continuously adjustable positioning of said flapping hinge and the blade carried thereby, said hinge having one position in said swing wherein the axis of the hinge lies on a plane normal to said central axis.

2. In an aircraft, a rotor hub rotatable about an axis, at least one air foil blade carried by said hub, each blade mounted on said hub by a flapping hinge to which the blade is attached, a bearing pivot carried by said hub a distance from said axis, said hinge axis passing through said bearing pivot and mounted thereby, a swingable link attached to said hinge a distance from said bearing pivot and extending to a pivot anchor carried by said hub a distance from said hinge, and means to drive said hinge through a segment of a substantially conical path established by said pivot and link, said hinge having a neutral position lying substantially on a plane normal to said vertical axis.

3. In an aircraft, having a rotor with a hub rotatable about a central axis and at least one lift wing blade extending therefrom of substantially airfoil cross section, the combination with said rotor of a flapping hinge structure physically establishing a flapping axis spaced from said hub axis, said flapping hinge structure including a universal pivot carried by said hub at a fixed location spaced with respect to the said central axis swingable link means tying a second point of said flapping hinge structure to a substantially fixed pivot carried by said hub, said hinge having a neutral position lying substantially on a plane normal to said central axis, said flapping hinge thereby having one support point fixed in location with respect to said hub and a second point swingable in a substantially arcuate path, and control means in operative drive relationship with said flapping hinge to drive said flapping axis in its established swingable field.

4. In an aircraft, having a rotor with a hub rotatable about a central axis, a first and second lift wing blade extending radially therefrom, the combination with said rotor of, a first flapping hinge structure physically establishing a flapping axis of the first blade, a second flapping hinge structure physically establishing a flapping axis of the second blade, said first hinge structure having a hinge axle, a first universal pivot carried by said hub a distance laterally of said vertical axis at a fixed location with respect to said axis of said rotor, said axle of said first hinge structure extending through said first pivot with a first end thereof on one side of the pivot and a second end on the other, said second hinge structure having a hinge axle, a second universal pivot carried by said hub a distance laterally of said vertical axis on the side opposite said rotor axis at a fixed location with respect to said axis, said axle of said second hinge structure extending through said second pivot with a first end thereof on one side of the pivot and a second end on the other, said first ends of the first and second hinge structure axles extending in opposite directions, a first swingable link tying said second end of said first axle to said first end of said second axle, a second swingable link tying said second end of said second axle to said first end of said first axle, said first and second links being generally parallel to one another and positioned to swing in a direction generally parallel to said axis of the rotor, said hinge of each blade thereby having one support point fixed in location with respect to said hub and a second point swingable in a substantially arcuate path and control means in operation drive relationship with said second ends of said first and second hinge structure axles to drive the axles simultaneously and equally in their respective established swingable fields.

5. A rotary wing aircraft blade and blade control combination, comprising, a first and second lift wing blade extending in opposed directions, said first and second blades each having a first axis extending longitudinally thereof, each said first and second blades having a second axis threeof extending transversely with respect to the first axis thereof, a first flapping hinge structure physically establishing said second axis of the first blade, a second flapping hinge structure physically establishing said second axis of the second blade, said first flapping hinge structure including a first universal pivot, said second flapping hinge structure including a second universal pivot, a first link carried by said first hinge structure, a second link carried by said second hinge structure, said first and second link located in substantially parallel relationship and constituting opposite sides of a rectangle, said first hinge establishing an axis as a third side of said rectangle, said second hinge establishing an axis as a fourth side of said rectangle, said first and second universal pivots lying at diagonally opposite corner locations of said rectangle, control means in drive connection to said first and second hinge providing a simultaneous and equal swing of said first and second axis about the said first and second universal pivot respectively, and means to rotate said combination around a common axis in flight propulsion.

6. In the helicopter blade and blade control combination as set forth in claim 5, said universal pivots being spherical bearings, said first and second flapping hinge structures having pin axles along said axis, each pin axle extending through the said spherical bearing of its universal pivot and said first and second links carried by attachment to the portions of the pin axles so extended.

7. An aircraft rotor hub and rotor blade construction, comprising, a rotatable hub having a center of rotation, a universal pivot joint carried by said hub at a fixed location with respect to the axis of rotation of said hub, a rotor blade having a root end, a flapping hinge blade support having an axle pin, said blade having a longitudinal axis swingable about said pin, said universal joint being a spherical bearing, said bearing mounting said pin on said hub at said first universal joint location, a link, a second spherical bearing connecting said link and said axle pin a distance from said first joint location, said link extending to a second joint location, a third spherical bearing carried by said hub at said second joint location, said first and second joint locations and said second spherical bearing lying in a triangular relationship with the second spherical bearing being a movable apex to flex the defined triangle, said defined triangle lying generally in a plane which is generally normal to the axis of hub rotation, and control means adapted to drive said apex to a selected position, said spherical bearings providing both rotatability and pivotability of the axle pin and link to allow the axle pin to swing freely.

8. In a helicopter, having a rotor with a hub rotatable about a vertical axis and at least one lift wing blade extending therefrom of substantially airfoil cross-section, the combination of, a universal mount structure supported by said hub and supporting said lift wing blade for controlled rotation about the axis of said rotor, means for adjusting the pitch of the blade about a first axis extending longitudinally of the lift wing, a flapping hinge structure physically establishing a second axis extending transversely with respect to the first axis, said flapping hinge structure including a universal pivot carried by said hub at a fixed location with respect to the axis of said rotor, swingable link means tying a second point of said second axis to said hub, said link positioned to swing in a direction generally parallel to the said axis of the rotor, said second axis thereby having one support point fixed in location with respect to said hub and a second point swingable in a substantially arcuate path, and control means in operative drive relationship with said second axis to drive said axis in its established swingable field, whereby the said first axis is angularly adjusted with respect to said rotor axis and the blade is rotated with respect to said first axis for flight control.

9. In the mount structure of claim 8, said flapping hinge structure including a hinge axle, said universal pivot carried by the hub being a spherical bearing, and said hinge axle carried by said spherical bearing.

10. In the mount structure of claim 9, said flapping hinge structure including a hinge axle, said universal pivot carried by the hub being a spherical bearing, said hinge axle carried by said spherical bearing, and said swingable link attached to said hub and to said hinge axle by spherical bearings.

11. In a helicopter, having a rotor with a hub rotatable about a vertical axis, a first and a second lift wing blade extending radially therefrom of substantially airfoil cross-section, the combination of, a universal mount structure supported by said hub and supporting said first and second wing blades for controlled rotation about the axis of said rotor, means for adjusting the pitch adjustment of each blade about a first axis of the blade extending longitudinally of the lift wing, a first flapping hinge structure physically establishing a second axis of the first blade, a second flapping hinge structure physically establishing a second axis of the second blade, said second axis of each blade extending transversely with respect to the first axis thereof, said first hinge structure having a hinge pin axle, a first universal pivot carried by said hub a distance laterally of said vertical axis at a fixed location with respect to said axis of said rotor, said hinge pin axle of said first hinge structure extending through said first pivot with a first end thereof on one side of the pivot and a second end on the other, said second hinge structure having a hinge pin axle, a second universal pivot carried by said hub a distance laterally of said vertical axis on the side opposite said rotor axis at a fixed location with respect to said axis, said first and second universal pivots being offset with respect to a plane parallel with and passing through said rotor axis, said pin axle of said second hinge structure extending through said second pivot with a first end thereof on one side of the pivot and a second end on the other, said first ends of the first and second hinge structure pin axles extending in opposite directions, a first swingable link tying said second end of said first pin axle to said first end of said second pin axle, a second swingable link tying said second end of said second pin axle to said first end of said first pin axle, said first and second links being generally parallel to one another and positioned to swing in a direction generally parallel to said axis of the rotor, said second axis of each rotor thereby having one support point fixed in location with respect to said hub and a second point swingable in a substantially arcuate path, and control means in operative drive relationship with said second ends of said first and second hinge structure pin axles to drive the pin axles simultaneously and equally in their respective established swingable fields.

12. A helicopter blade and blade control combination, comprising, a first and second lift wing blade extending in opposed directions, said first and second blades each having a first axis extending longitudinally thereof, each said first and second blades having a second axis thereof extending transversely with respect to the first axis thereof, a first flapping hinge structure physically establishing said second axis of the first blade, a second flapping hinge structure physically establishing said second axis of the second blade, said first flapping hinge structure including a first universal pivot, said second flapping hinge structure including a second universal pivot, a first link carried by said first hinge structure, a second link carried by said second hinge structure, said first and second link located in substantially parallel relationship and constituting opposite sides of a rectangle, said first hinge establishing an axis as a third side of said rectangle, said second hinge establishing an axis as a fourth side of said rectangle, said first and second universal pivots lying at diagonally opposite corner locations of said rectangle, control means in drive connection to said first and second hinge providing a simultaneous opposite and equal swing of said first and second axis about the said first and second universal pivot respectively, and means to rotate said combination around a common axis in flight propulsion.

13. In the helicopter blade and blade control combination as set forth in claim 12, said universal pivots being spherical bearings, said first and second flapping hinge structures having pin axles along said axis, each pin axle extending through the said spherical bearing of its universal pivot and said first and second links carried by attachment to the portions of the pin axles so extended.

References Cited in the file of this patent

UNITED STATES PATENTS 1,830,731   Wylie  ---------------- Nov. 3, 1931